(12) United States Patent
Han

(10) Patent No.: US 9,977,757 B2
(45) Date of Patent: May 22, 2018

(54) PREVENTED INTER-INTEGRATED CIRCUIT ADDRESS CONFLICT SERVICE SYSTEM AND METHOD THEREOF

(71) Applicants: Inventec (Pudong) Technology Corporation, Shanghai (CN); INVENTEC CORPORATION, Taipei (TW)

(72) Inventor: Ying-Xian Han, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 183 days.

(21) Appl. No.: 15/171,687

(22) Filed: Jun. 2, 2016

(65) Prior Publication Data

US 2017/0192925 A1 Jul. 6, 2017

(30) Foreign Application Priority Data

Jan. 5, 2016 (CN) .......................... 2016 1 0004526

(51) Int. Cl.
*G06F 13/00* (2006.01)
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC .................. G06F 13/4027; G06F 13/4282
See application file for complete search history.

(56) References Cited

U.S. PATENT DOCUMENTS

| 2007/0156935 | A1* | 7/2007 | Ellison | G06F 13/4295 710/106 |
| 2008/0288684 | A1* | 11/2008 | Ellison | G06F 13/4295 710/106 |
| 2010/0073275 | A1* | 3/2010 | Kim | G09G 3/342 345/102 |
| 2012/0191889 | A1* | 7/2012 | Fischer | G06F 13/4291 710/110 |
| 2013/0275647 | A1* | 10/2013 | Bradley | G06F 13/385 710/309 |

\* cited by examiner

*Primary Examiner* — Jing-Yih Shyu
(74) *Attorney, Agent, or Firm* — Muncy, Geissler, Olds & Lowe, P.C.

(57) ABSTRACT

In the system, a buffer and a multiplexer are electrically connected to an I²C interface and a control interface of a PCH. A plurality of memory are electrically connected to the buffer and corresponding to a first I²C address respectively. A plurality of card slots are electrically connected to the multiplexer for connecting to a function card so that the function card is corresponding to a second I²C address. When the first I²C address is distinct to the second I²C address, the PCH triggers the multiplexer to be enabled through the control interface to have the function card electrically connected to the PCH through the I²C interface. When the first I²C address is the same as the second I²C address, the PCH triggers the multiplexer or the buffer to be disabled through the control interface to have the function card or the memories electrically connected to the PCH through the I²C interface.

8 Claims, 5 Drawing Sheets

PREVENTED INTER-INTEGRATED CIRCUIT ADDRESS CONFLICT SERVICE SYSTEM AND METHOD THEREOF

BACKGROUND OF INVENTION

1. Field of the Invention

The invention is related to a system for preventing address conflict and a method thereof, and more particularly related to a system for preventing address conflict and a method thereof by using the platform controller hub (PCH) to determine whether the inter-integrated circuit ($I^2C$) interface addresses of the memory and the function card are the same to selectively enable the multiplexer.

2. Description of the Prior Art

Attending with the progress of technology, network has played an indispensable role in our daily lives, and people are used to work with personal computers such as desktops or laptops, or even handle multinational e-business through the network. A server is an important apparatus for the construction of network, and thus are widely used in the server room of the industries of internet service provider (ISP).

In order to meet the need of function expansion, it is common to insert the function cards with various functions into the card slots of the server to expand the function of the server. As the function card is inserted into the card slot, it would be electrically connected to the inter-integrated circuit $I^2C$ interface of the platform controller hub (PCH) in the server and have a corresponding $I^2C$ interface address. However, the memory in the server is also electrically connected to the PCH through the same $I^2C$ interface and have the corresponding $I^2C$ interface address. As the function card and the memory are corresponding to the same $I^2C$ interface address to result address conflict, an error would be resulted during the power-on procedure and thus the conventional technology needs to be improved.

SUMMARY OF THE INVENTION

As mentioned, when the function card and the memory are corresponding to the same $I^2C$ interface address, an error would be resulted during the power-on procedure of the server. Accordingly, it is a main object of the invention to provide a system for preventing address conflict and a method thereof, which uses the PCH to determine whether the $I^2C$ interface addresses of the memory and the function card are the same, and when the determination is yes, cut off one of the paths from the conflicted devices through the $I^2C$ interface to the PCH to resolve the above mentioned problem.

In accordance with the above mentioned object, a system for preventing address conflict is provided in the invention. The system comprises a PCH, a buffer, a multiplexer, a plurality of memories, and a plurality of card slots. The PCH includes an $I^2C$ interface and at least one control interface. The buffer is electrically connected to the $I^2C$ interface and the at least one control interface. The multiplexer is electrically connected to the $I^2C$ interface and the at least one control interface. The memories are electrically connected to the buffer. Each memory is corresponding to a first $I^2C$ interface address and electrically connected to the PCH via the buffer and through the $I^2C$ interface. The card slots are electrically connected to the multiplexer. Each card slot is utilized for inserting a function card. The function card is corresponding to a second $I^2C$ address when being inserted into one of the card slots. Wherein, when the PCH determines that the first $I^2C$ address corresponding to each of the memory is different from the second $I^2C$ address corresponding to the inserted function card, the PCH transmits a first control signal through the at least one control interface to the multiplexer to enable the multiplexer so as to have the inserted function card electrically connected to the PCH through the $I^2C$ interface. Wherein, when the PCH determines that one of the first $I^2C$ addresses corresponding to the memories is the same as the second $I^2C$ address corresponding to the inserted function card, the PCH selectively transmits a second control signal or a third control signal through the at least one control interface to the multiplexer and the buffer. Wherein, when the multiplexer and the buffer receive the second control signal, the multiplexer is disabled but the buffer remains enabled so as to cut off an electrical connection from the function card through the $I^2C$ interface to the PCH and have each of the memories electrically connected to the PCH through the $I^2C$ interface. Wherein, when the multiplexer and the buffer receive the third control signal, the multiplexer is enabled but the buffer is disabled so as to have the function card electrically connected to the PCH through the $I^2C$ interface and cut off an electrical connection from each of the memories through the $I^2C$ interface to the PCH.

In accordance with an embodiment of the system for preventing address conflict, the system further comprises a processing unit. The processing unit is electrically connected to the PCH and the card slots, and includes a basic input/output system (BIOS). The BIOS is utilized for triggering the PCH to determine whether the first $I^2C$ address corresponding to each of the memories is the same as the second $I^2C$ address when detecting the function card inserted into one of the card slots. In addition, the at least one control interface is a general-purpose input/output (GPIO) interface, the first control signal, the second control signal, and the third control signal are GPIO signals, and the function card is a peripheral component interconnect express (PCI-E) card.

In accordance with the above mentioned object, a method for preventing address conflict by using the above mentioned system is provided. The method is adopted as the function card is inserted into one of the card slots. The method for preventing address conflict comprises the following steps (a) to (d). Step (a) is to detect, by using the PCH, the first $I^2C$ address corresponding to each of the memories and the second $I^2C$ address. Step (b) is to determine, by using the PCH, whether one of the first $I^2C$ addresses is the same as the second $I^2C$ address. Step (c) is to transmit, by using the PCH, a first control signal through the at least one control interface to the multiplexer to enable the multiplexer so as to have the inserted function card electrically connected to the PCH through the $I^2C$ interface if the determination of step (b) is no. Step (d) is to selectively transmit, by using the PCH, a second control signal or a third control signal through the at least one control interface to the multiplexer and the buffer if the determination of step (b) is yes. Wherein, when the multiplexer and the buffer receive the second control signal, the multiplexer is disabled but the buffer remains enabled so as to cut off an electrical connection from the function card through the $I^2C$ interface to the PCH and have each of the memories electrically connected to the PCH through the $I^2C$ interface. Wherein, when the multiplexer and the buffer receive the third control signal, the multiplexer is disabled but the buffer is enabled so as to have the function card electrically connected to the PCH through the I²C interface and cut off an electrical connection from each of the memories through the I²C interface to the PCH.

In accordance with an embodiment of the method for preventing address conflict, the system for preventing address conflict further comprises a processing unit, which is electrically connected to the PCH and the card slots and includes a basic input/output system (BIOS). The method for preventing address conflict further comprises the step (a0) before the step (a) to determine, by using the BIOS, whether the function card is inserted into one of the card slots, and the step (a) is performed when the determination is yes. In addition, the at least one control interface is a general-purpose input/output (GPIO) interface, the first control signal, the second control signal, and the third control signal are GPIO signals, and the function card is a peripheral component interconnect express (PCI-E) card.

By using the system for preventing address conflict and the method thereof provided in the invention, the multiplexer or the buffer can be disabled to prevent address conflict directly when the first I²C address is the same se the second I²C address, thus, the error during the power-on procedure can be prevented and thus the operational convenience can be significantly improved.

BRIEF DESCRIPTION OF THE DRAWINGS

The invention will now be specified with reference to its embodiment illustrated in the drawings, in which.

DESCRIPTION OF THE EMBODIMENT

There are various embodiments of the system for preventing address conflict and a method thereof, provided in the invention, which are not repeated hereby. An embodiment for the system for preventing address conflict and two embodiments for the method for preventing address conflict are mentioned in the following paragraphs as an example.

Figure 1:
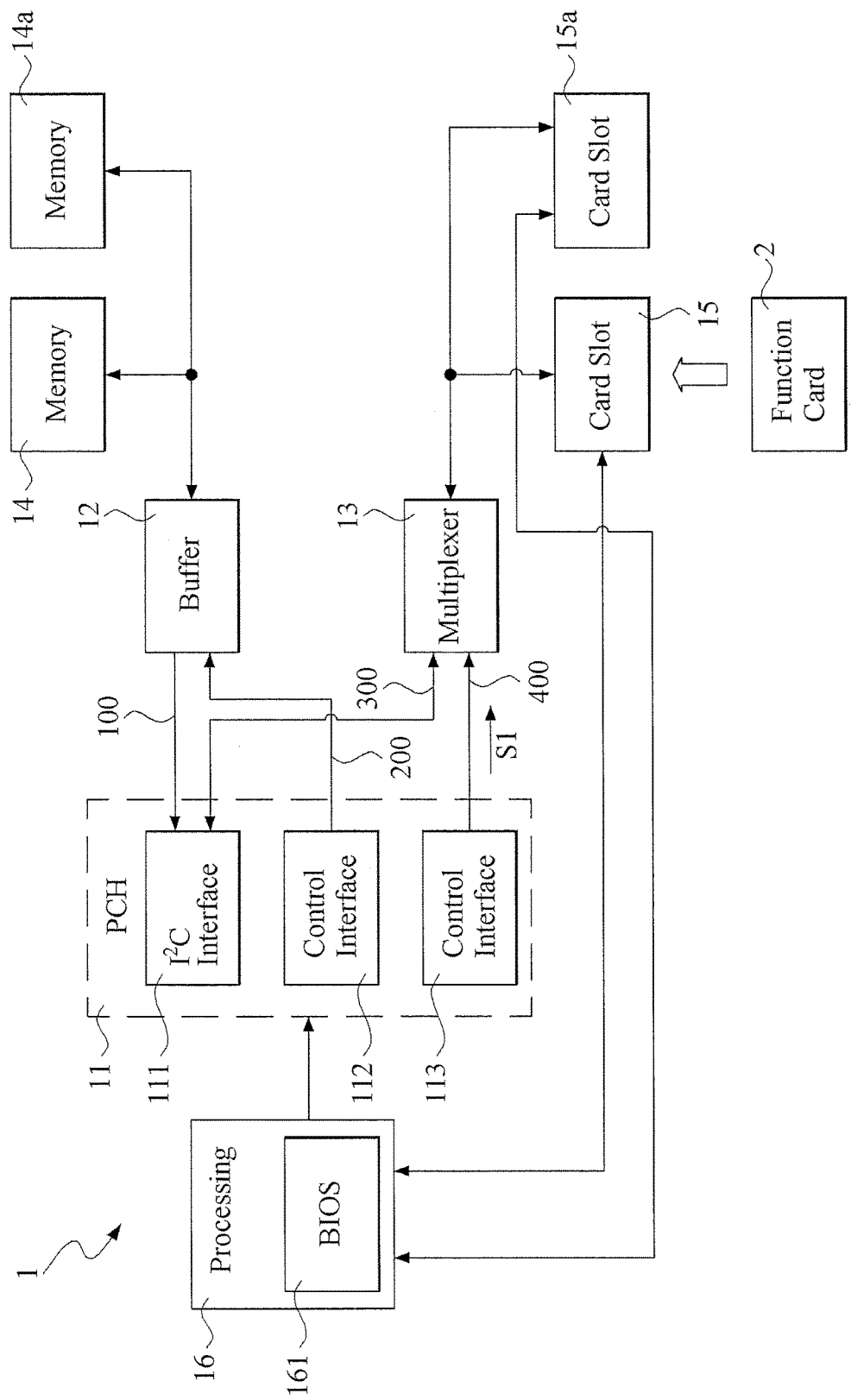
FIG. 1 is a block diagram showing a system for preventing address conflict in accordance with an embodiment of the invention.
Figure 2:
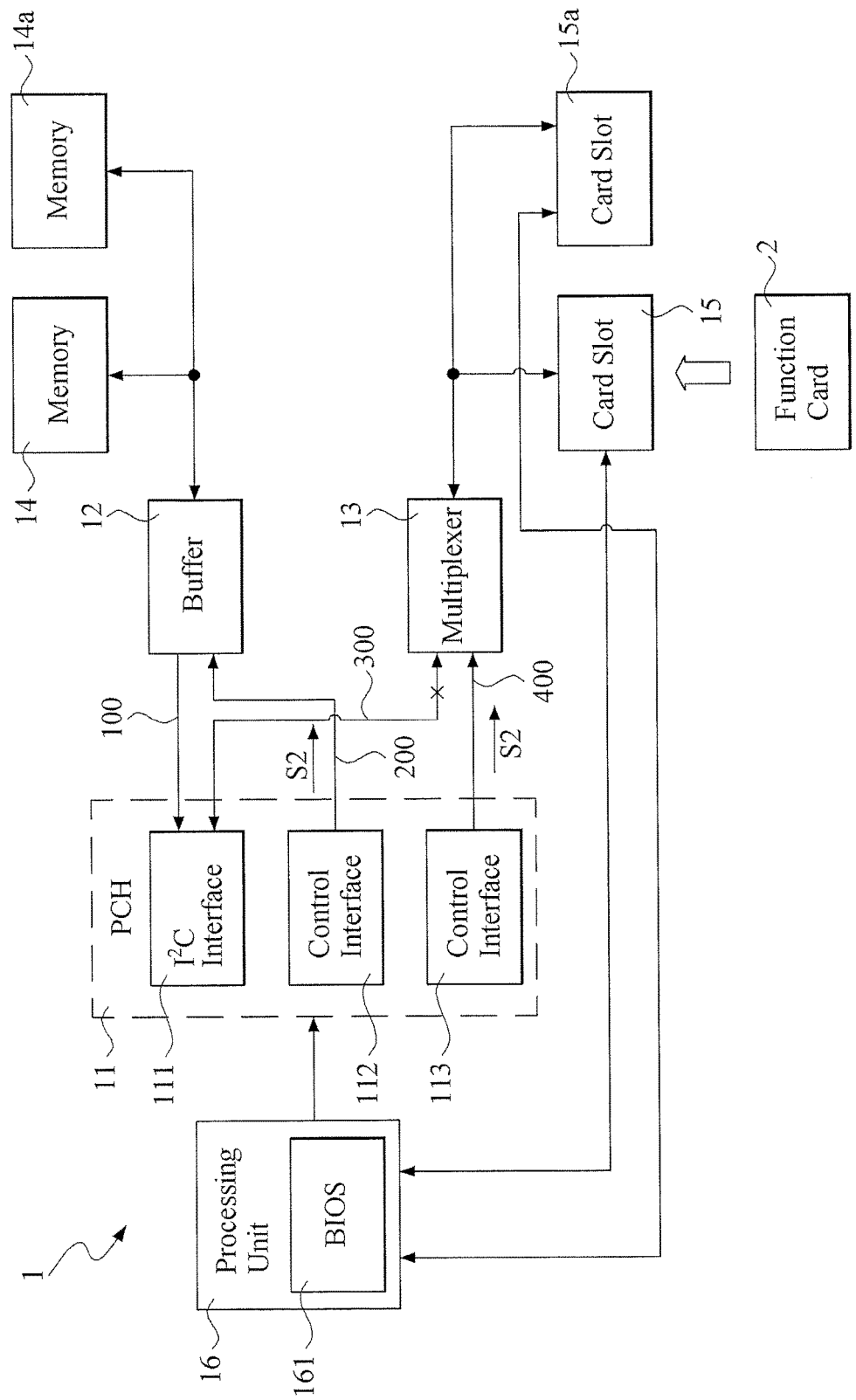
FIG. 2 is a block diagram showing the system for preventing address conflict with the multiplexer being disabled in accordance with the embodiment of the invention.
Figure 3:
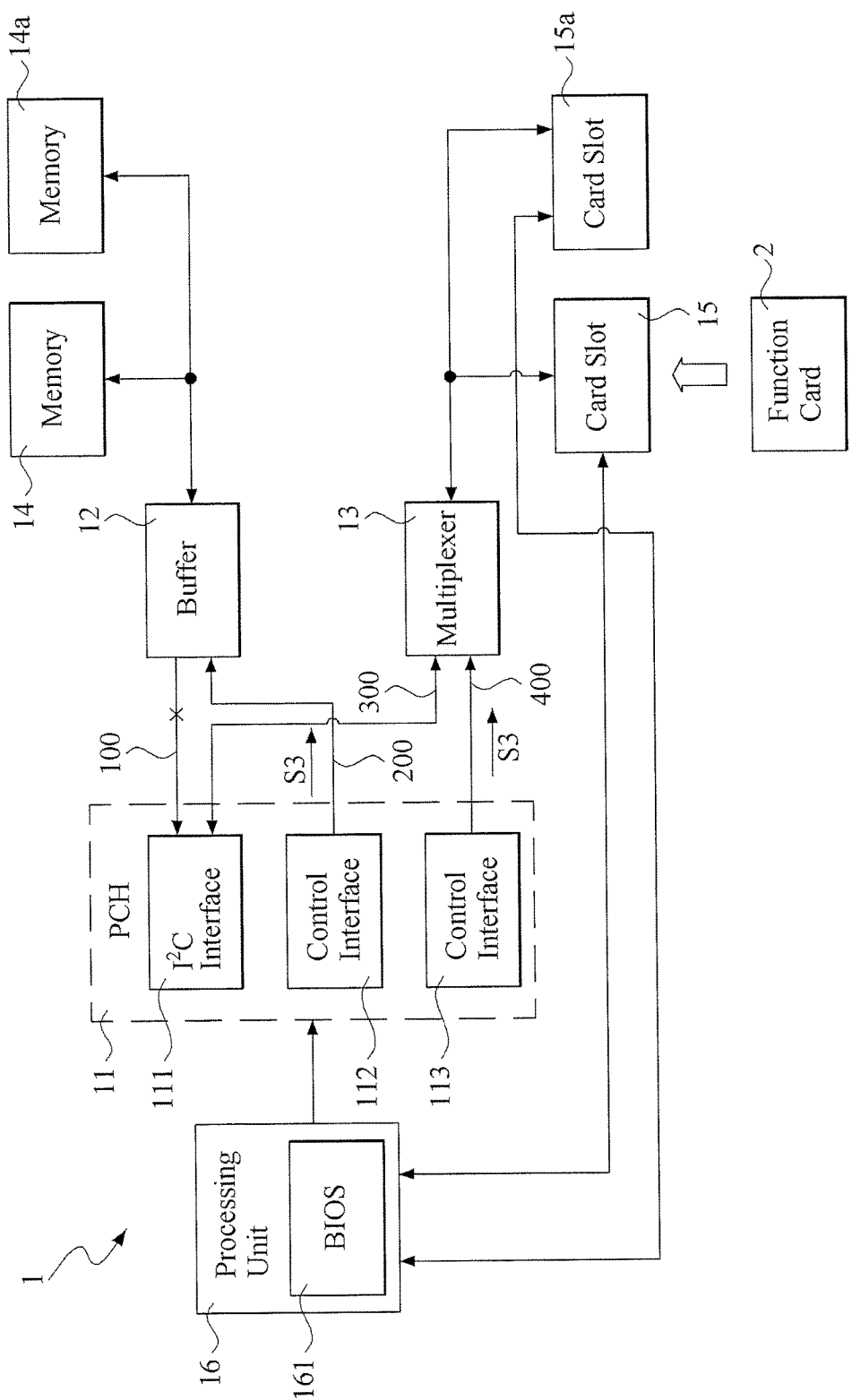
FIG. 3 is a block diagram showing the system for preventing address conflict with the buffer being disabled in accordance with the embodiment of the invention.

Please refer to FIG. 1 to FIG. 3, wherein FIG. 1 is a block diagram showing a system for preventing address conflict in accordance with an embodiment of the invention, FIG. 2 is a block diagram showing the system for preventing address conflict with the multiplexer being disabled in accordance with an embodiment of the invention, and FIG. 3 is a block diagram showing the system for preventing address conflict with the buffer being disabled in accordance with an embodiment of the invention. As shown, the system 1 for preventing address conflict in accordance with the embodiment of the invention comprises a PCH 11, a buffer 12, a multiplexer 13, a plurality of memories 14, 14a, a plurality of card slots 15, 15a and a processing unit 16.

The PCH 11 includes an I²C interface 111 and at least one control interface 112, 113. The control interface 112, 113 may be a GPIO interface. Two control interfaces 112 and 113 are shown in the embodiment as an example, however, the invention is not so restricted. The number of the control interface may be one or other numbers, which depend on the needs of design in practice.

The buffer 12 is electrically connected to the I²C interface 111 and the control interface 112 of the PCH 11. That is, there exist an I²C path 100 (i.e. the path electrically connected to the I²C interface 111) and a control path 200 (i.e. the path electrically connected to the control interface 112) between the buffer 12 and the PCH 11.

The multiplexer 13 is electrically connected to the I²C interface 111 and the control interface 113 of the PCH 11. That is, there exist an I²C path 300 (i.e. the path electrically connected to the I²C interface 111) and a control path 400 (i.e. the path electrically connected to the control interface 113) between the multiplexer 13 and the PCH 11.

The memories 14, 14a are electrically connected to the buffer 12. Each memory 14, 14a is corresponding to a first I²C address, and is electrically connected to the PCH 11 via the buffer 12 and through the I²C interface 111. For the purpose of simplifying the figures, only the memories 14, 14a are shown but the memory slots are skipped to represent that the memories 14, 14a are inserted into the slots in the beginning and each of the memories 14, 14a is corresponding to the first I²C address respectively. For example, the first I²C address corresponding to the memory 14 is 00000001, and the first I²C address corresponding to the memory 14a is 00000002. It should be noted that because the function of the I²C interface 111 is for transmitting data but the control interfaces 112 and 113 are merely for controlling the on/off state of the buffer 112 and the multiplexer 13. Thus, the operation of the memories 14, 14a corresponding to the I²C interface 111 needs the I²C address (i.e. to transmitting data through the I²C path 100), but does not need the address corresponding to the control interfaces 112, 113.

The card slots 15, 15a are electrically connected to the multiplexer 13. Each of the card slots 15, 15a is utilized for inserting a function card 2. When the function card 2 is inserted into one of the card slots 15, 15a, a second I²C address is assigned to the function card 2. For example, in accordance with an embodiment, the function card 2 is a peripheral component interconnect express (PCI-E) card to be inserted into the card slot 15. After the function card 2 had been inserted into the card slot 15, the function card 2 would be corresponding to the second I²C address and also electrically connected to the multiplexer 13 through the card slot 15 and only operate through the I²C interface 111 (i.e. transmitting data through the I²C path 300). Thus, the function card 2 only needs the I²C address and the addresses for the control interfaces 112, 113 are not needed. Only one function card 2 is shown in the embodiment, however, the invention is not so restricted. In accordance with other embodiments of the invention, two or more function cards 2 may be inserted into the card slots 15, 15a and have their corresponding second I²C addresses, which depends on the needs of design in practice.

The processing unit 16 is electrically connected to the PCH 11 and the card slots 15, 15a, and is set with a basic input/output system (BIOS) 161. The processing unit 16 may be a central processing unit (CPU) for example. However, the invention is not so restricted. For example, the processing unit 16 might be the other processor or processing circuit with processing capability.

As shown in FIG. 1, the BIOS 161 is utilized for determining whether the function card 2 is inserted into one of the card slots 15, 15a. In accordance with an embodiment of the invention, after the function card 2 is inserted into the card slot 15, the BIOS 161 determines that the function card 2 is inserted into the card slot 15, then the processing unit 16 triggers the PCH 11 to determine whether the first I²C address corresponding to each of the memories 14, 14a is different from the second I²C address. For example, assume the second I²C address is 00000003, the PCH 11 would determine that the first I²C address corresponding to each of the memories 14, 14a is different from the second I²C address. At this time, the PCH 11 transmits a first control signal S1 through the control interface 113 to the multiplexer 13 to enable the multiplexer 13 so as to conduct the I²C path 300 to have the function card 2 electrically connected to the PCH 11 through the I²C interface 111 and operated normally. It should be noted that, in general, the memories 14, 14a are enabled in the beginning. That is, the memories 14, 14a are electrically connected to the PCH 11 through the I²C interface 111 in the beginning for transmitting data through the I²C path 100.

Similarly, as shown in FIG. 2, when the BIOS 161 determines that the function card 2 is inserted into the card slot 15, assume that the second I²C address is 00000001, the PCH 11 would determine that one of the first I²C addresses corresponding to the memories 14, 14a is the same as the second I²C address (in the embodiment, the second I²C address is the same as the first I²C address corresponding to the memory 14), and selectively transmit a second control signal S2 or a third control signal S3 to the multiplexer 13 and the buffer 12 through the control interfaces 112, 113.

To be more precisely, as shown in FIG. 2, the PCH 11 transmits the second control signal S2 through the control interfaces 112, 113 to the multiplexer 13 and the buffer 12. As the multiplexer 13 and the buffer 12 receive the second control signal S2, the multiplexer 13 is triggered to be disabled but the buffer 12 remains enabled, then the I²C path 100 is conducted but the I²C path 300 is turned off to cut off the electrical connection from the function card 2 through the I²C interface 111 to the PCH 11 but have each of the memories 14, 14a electrically connected to the PCH 11 through the I²C interface 111. That is, the embodiment in FIG. 2 is performed by turning off the I²C path 300 corresponding to the function card 2 such that the function card 2 cannot transmit data through the I²C interface 111, but the control paths 200, 400 remain conducted.

On the other hand, as shown in FIG. 3, the PCH 11 transmits the third control signal S3 through the control interfaces 112, 113 to the multiplexer 13 and the buffer 12. As the multiplexer 13 and the buffer 12 receive the third control signal S3, the multiplexer 13 is triggered to be enabled but the buffer 12 is triggered to be disabled, then the I²C path 100 is turned off but the I²C path 300 is conducted to have the function card 2 electrically connected to the PCH 11 through the I²C interface 111 but cut off the electrical connection from each of the memories 14, 14a through the I²C interface 111 to the PCH 11. That is, the embodiment in FIG. 3 is performed by turning off the I²C path 100 corresponding to the memories 14, 14a such that the memories 14, 14a cannot transmit data through the I²C interface 111, but the control paths 200, 400 remain conducted.

It should be noted that the above mentioned first control signal S1, the second control signal, S2, and the third control signal S3 are general-purpose input/output (GPIO) signals, i.e. the signals with GPIO format. In addition, the criteria for selectively disabling the buffer 12 or the multiplexer 13 is based on the priority of the memories 14, 14a and the function card 2 preliminarily determined by the BIOS system 161. If the memories 14, 14a are more important, then the processing unit 16 would trigger the PCH 11 to disable the multiplexer 13; but if the function card 2 is more important, the processing unit 16 would trigger the PCH 11 to disable the buffer 12.

Figure 4:
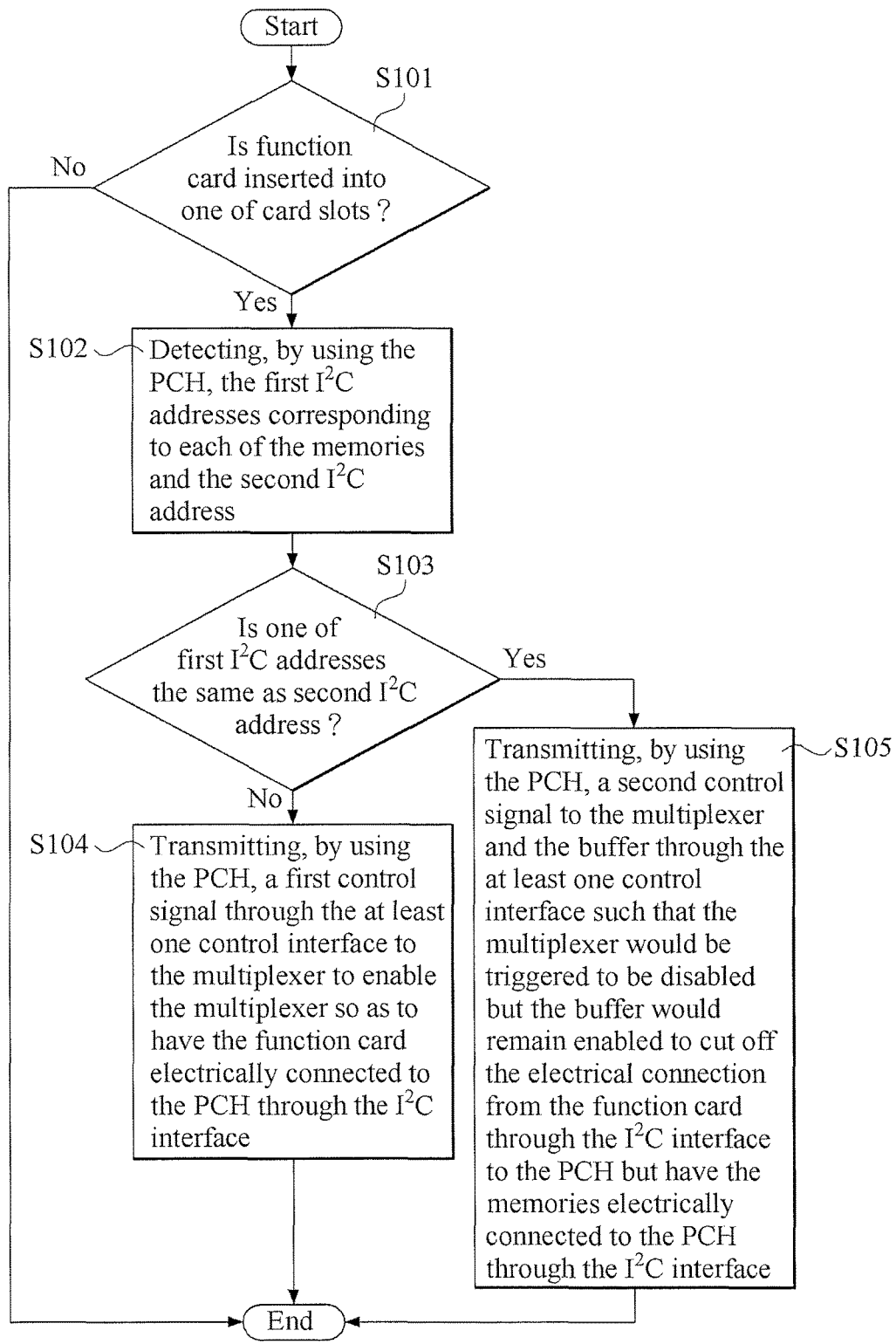
FIG. 4 is a flow chart showing the method for preventing address conflict in accordance with the embodiment of the invention.

Please refer to FIGS. 1, 2, and 4, wherein FIG. 4 is a flow chart showing the method for preventing address conflict in accordance with an embodiment of the invention. As shown, the method for preventing address conflict is performed by using the above mentioned system 1, and is adopted as the function card 2 is inserted into one of the card slots 15, 15a. The method comprises the steps of:

Step S101: determining, by using the BIOS 161, whether the function card 2 is inserted into one of the card slots 15, 15a.

Step S102: detecting, by using the PCH 11, the first I²C addresses corresponding to each of the memories 14, 14a and the second I²C address.

Step S103: determining, by using the PCH 11, whether one of the first I²C addresses is the same as the second I²C address.

Step S104: transmitting, by using the PCH 11, a first control signal S1 through the at least one control interface 113 to the multiplexer 13 to enable the multiplexer 13 so as to have the function card 2 electrically connected to the PCH 11 through the I²C interface 111 as shown in FIG. 1.

Step S105: transmitting, by using the PCH 11, a second control signal S2 to the multiplexer 13 and the buffer 12 through the at least one control interface 112, 113 such that the multiplexer 13 would be triggered to be disabled but the buffer 12 would remain enabled to cut off the electrical connection from the function card 2 through the I²C interface 111 to the PCH 11 but have the memories 14, 14a electrically connected to the PCH 11 through the I²C interface 111.

The detail of the above mentioned steps can be referred to the description about the system 1 for preventing address conflict, and thus is not repeated here.

Figure 5:
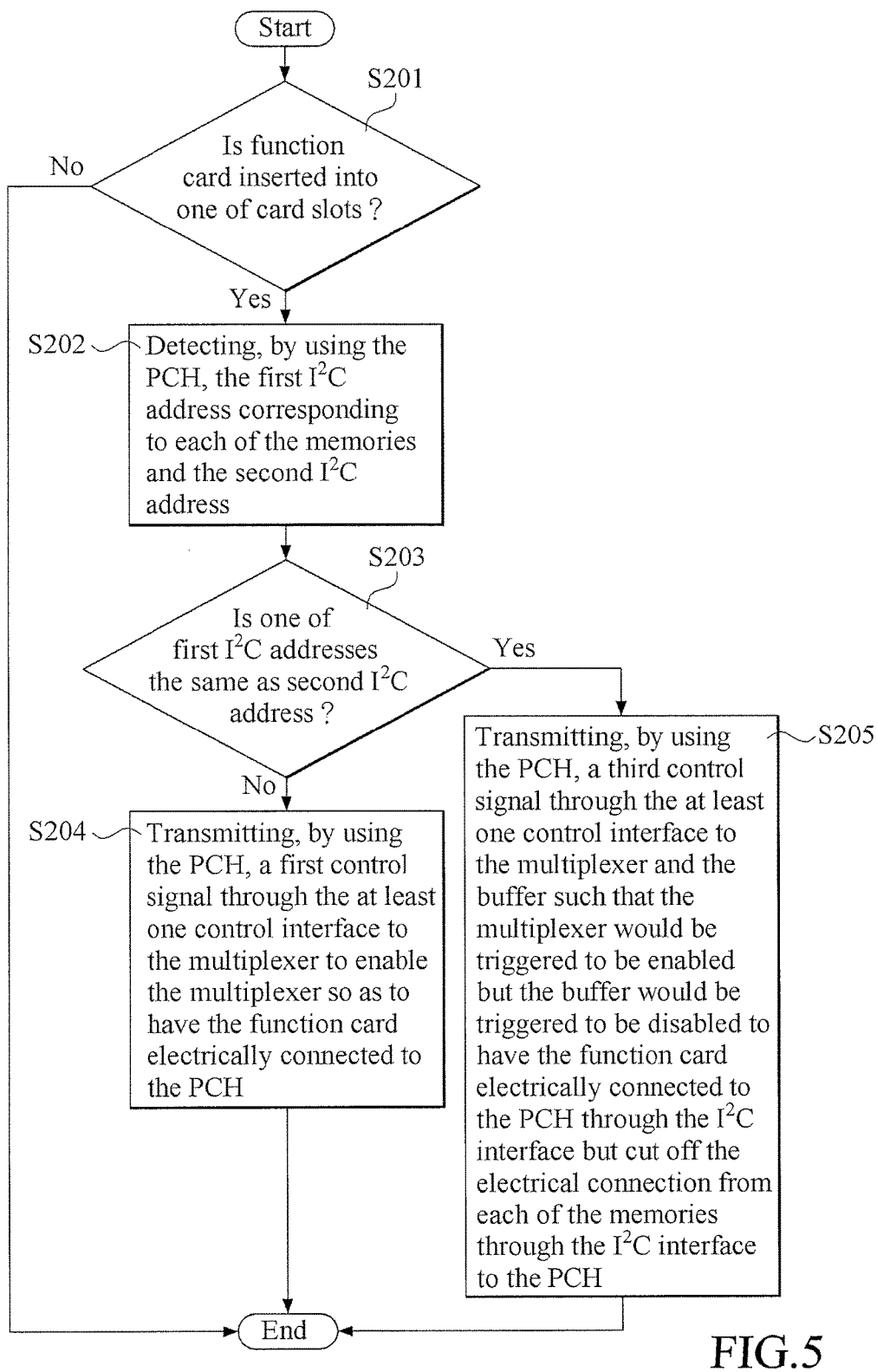
FIG. 5 is a flow chart showing the method for preventing address conflict in accordance with another embodiment of the invention.

Please refer to FIGS. 1, 3, and 5, wherein FIG. 5 is a flow chart showing the method for preventing address conflict in accordance with another embodiment of the invention. As shown, the method for preventing address conflict is performed by using the above mentioned system 1, and is adopted as the function card 2 is inserted into one of the card slots 15, 15a. The method comprises the steps of:

Step S201: determining, by using the BIOS 161, whether the function card 2 is inserted into one of the card slots 15, 15a.

Step S202: detecting, by using the PCH 11, the first I²C address corresponding to each of the memories 14, 14a and the second I²C address.

Step S203: determining, by using the PCH 11, whether one of the first I²C addresses is the same as the second I²C address.

Step S204: transmitting, by using the PCH 11, a first control signal S1 through the at least one control interface 113 to the multiplexer 13 to enable the multiplexer 13 so as to have the function card 2 electrically connected to the PCH 11 (as shown in FIG. 1).

Step S205: transmitting, by using the PCH 11, a third control signal S3 through the at least one control interface 112, 113 to the multiplexer 13 and the buffer 12 such that the multiplexer 13 would be triggered to be enabled but the buffer 12 would be triggered to be disabled to have the function card 2 electrically connected to the PCH 11 through the I²C interface 111 but cut off the electrical connection from each of the memories 14, 14a through the I²C interface 111 to the PCH 11.

Similarly, the detail of the above mentioned steps can be referred to the description about the system 1 for preventing address conflict and thus is not repeated here.

In conclusion, by using the system for preventing address conflict and the method thereof, the multiplexer or the buffer can be disabled to prevent address conflict directly when the first I²C address is the same se the second I²C address, thus, the error during the power-on procedure can be prevented and thus the operational convenience can be significantly improved.

The detail description of the aforementioned embodiments is for clarifying the feature and the spirit of the invention. The invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the invention without departing from the scope of the invention as defined by the appended claims.

What is claimed is:

1. A system for preventing address conflict, comprising:
   a platform controller hub (PCH), including an inter-integrated circuit (I²C) interface and at least one control interface;
   a buffer electrically connected to the I²C interface and the at least one control interface;
   a multiplexer electrically connected to the I²C interface and the at least one control interface;
   a plurality of memories electrically connected to the buffer, each of the memories being corresponding to a first I²C address and electrically connected to the PCH via the buffer and through the I²C interface; and
   a plurality of card slots electrically connected to the multiplexer, each of the card slots being utilized for inserting a function card, which is corresponding to a second I²C address when being inserted into one of the card slots;
   wherein, when the PCH determines that the first I²C address corresponding to each of the memories is different from the second I²C address corresponding to the inserted function card, the PCH transmits a first control signal through the at least one control interface to the multiplexer to enable the multiplexer so as to have the inserted function card electrically connected to the PCH through the I²C interface;
   wherein, when the PCH determines that one of the first I²C addresses corresponding to the memories is the same as the second I²C address corresponding to the inserted function card, the PCH selectively transmits a second control signal or a third control signal through the at least one control interface to the multiplexer and the buffer;
   wherein, when the multiplexer and the buffer receive the second control signal, the multiplexer is disabled, but the buffer remains enabled so as to cut off an electrical connection from the function card through the I²C interface to the PCH and have each of the memories electrically connected to the PCH through the I²C interface;
   wherein, when the multiplexer and the buffer receive the third control signal, the multiplexer is enabled, but the buffer is disabled so as to have the function card electrically connected to the PCH through the I²C interface and cut off an electrical connection from each of the memories through the I²C interface to the PCH.

2. The system for preventing address conflict of claim 1, further comprising a processing unit electrically connected to the PCH and the card slots, and including a basic input/output system (BIOS), wherein the BIOS is utilized for triggering the PCH to determine whether the first I²C address corresponding to each of the memories is the same as the second I²C address when the function card inserted into one of the card slots is detected.

3. The system for preventing address conflict of claim 1, wherein the at least one control interface is a general-purpose input/output (GPIO) interface, and the first control signal, the second control signal, and the third control signal are GPIO signals.

4. The system for preventing address conflict of claim 1, wherein the function card is a peripheral component interconnect express (PCI-E) card.

5. A method for preventing address conflict by using the system for preventing address conflict of claim 1, which is used when the function card is inserted into one of the card slots, and the method for preventing address conflict comprises the steps of:
   (a) detecting, by the PCH, the first I²C address corresponding to each of the memories and the second I²C address;
   (b) determining, by the PCH, whether one of the first I²C addresses is the same as the second I²C address;
   (c) if the determination of step (b) is no, transmitting, by the PCH, a first control signal through the at least one control interface to the multiplexer to enable the multiplexer so as to have the inserted function card electrically connected to the PCH through the I²C interface; and
   (d) if the determination of step (b) is yes, selectively transmitting, by the PCH, a second control signal or a third control signal through the at least one control interface to the multiplexer and the buffer;
   wherein, when the multiplexer and the buffer receive the second control signal, the multiplexer is disabled but the buffer remains enabled so as to cut off an electrical connection from the function card through the I²C interface to the PCH and have each of the memories electrically connected to the PCH through the I²C interface;
   wherein, when the multiplexer and the buffer receive the third control signal, the multiplexer is enabled but the buffer is disabled so as to have the function card electrically connected to the PCH through the I²C interface and cut off an electrical connection from each of the memories through the I²C interface to the PCH.

6. The method to preventing address conflict of claim 5, wherein the system for preventing address conflict further comprises a processing unit which is electrically connected to the PCH and the card slots, the processing unit includes a basic input/output system (BIOS), and before the step (a), the method further comprising the step (a0) which determines, by the BIOS, whether the function card is inserted into one of the card slots, and performs the step (a) when the determination is yes.

7. The method to preventing address conflict of claim 5, wherein the at least one control interface is a general-purpose input/output (GPIO) interface, and the first control signal, the second control signal, and the third control signal are GPIO signals.

8. The method to preventing address conflict of claim 1, wherein the function card is a peripheral component interconnect express (PCI-E) card.

\* \* \* \* \*